Jan. 30, 1951   J. C. RUTHERFORD   2,539,864
VINEYARD TAKE-OUT PLOW
Filed Aug. 1, 1946   2 Sheets-Sheet 1

Inventor
John C. Rutherford
By Bernard J. Jawley
Attorney

UNITED STATES PATENT OFFICE 2,539,864

VINEYARD TAKE-OUT PLOW

John C. Rutherford, Hammondsport, N. Y.

Application August 1, 1946, Serial No. 687,569

1 Claim. (Cl. 97—137)

This invention relates to vehicle-mounted earth tools for engaging earth and weeds between bushes, trees, posts and vines. The cultivation of earth between rows of vines in a vineyard can be easily accomplished with conventional cultivators. In cultivating between the rows, earth is usually thrown up between the individual vines, and weeds grow in this earth unless removed. It has been necessary to remove the earth and weeds between individual vines by hand with a hoe, or by a horse-drawn plow called a horse hoe. Later, the earth is replaced between the individual vines by plowing the earth back to and around the vines in the row.

It is therefore an object of this invention to provide a vehicle-mounted earth tool to take out earth and weeds between individual vines in a row as the vehicle moves along the row.

It is another object of this invention to provide a vehicle-mounted vineyard take-out plow which plow automatically adjusts itself in depth without regard for unevenness of the ground over which the vehicle wheels may be traveling.

It is a further object of this invention to provide a vehicle-mounted earth tool which can be easily extended from the side of the vehicle out beyond the wheels, and retracted to the side of the vehicle.

It is a further object of this invention to provide a vehicle-mounted vineyard take-out plow which can be raised up off the ground when not in use.

It is a further object of this invention to provide an earth tool extending laterally from the side of a vehicle, the earth tool engaging the earth at an angle such that substantially no force is needed to keep the earth tool in its extended position.

In pursuance of these objects, I provide a beam connected at its forward end by a universal joint to the side of a vehicle such as a farm tractor. The rearward end of the beam is provided with earth working tool or plow share. The rearward portion of the beam is connected by a linkage system to the side of the vehicle. The linkage includes two legs pivotally connected together so that they form an acute angle when the rearward end of the beam is withdrawn to the side of the vehicle and an obtuse angle when the rearward end is extended laterally from the side of the vehicle. A hand-operated lever is pivotally mounted on the vehicle and the load end of the lever is connected to the linkage near the mutual pivot of the legs, the lever moving in a vertical plane longitudinally of the vehicle. When the operator manipulates the lever, the angular relationship between the legs is varied with the result that the position of the beam relative to the side of the vehicle is varied as desired. I also provide a lever for engaging the underside of the beam and lifting it upwardly when the take-out plow is not in use.

Other and further objects will be apparent to those skilled in the art from the following specification:

Figure 1:
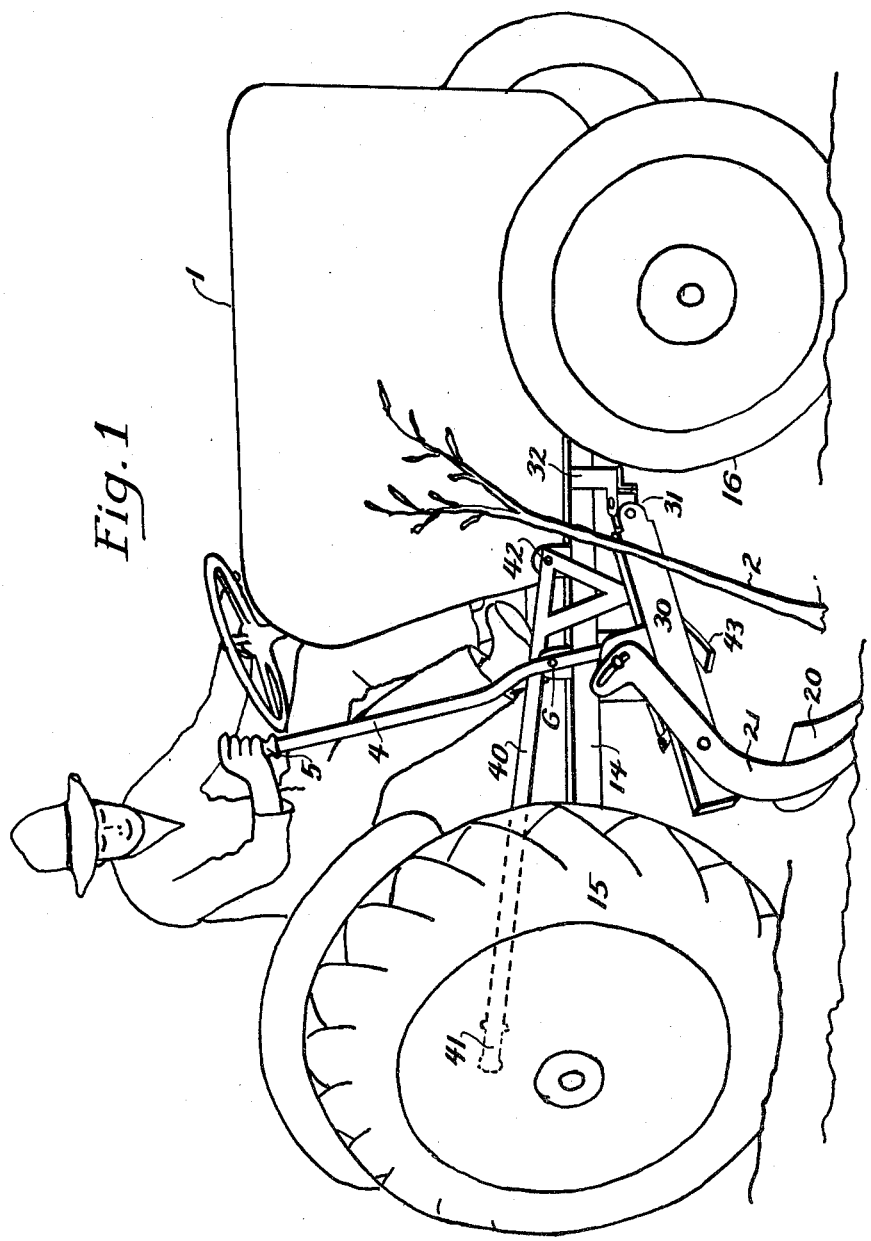
Figure 1 is a perspective view of a tractor, having an embodiment of the invention mounted on it, showing that by pushing a hand lever the plow can be withdrawn to the side of the tractor to avoid a vine.
Figure 2:
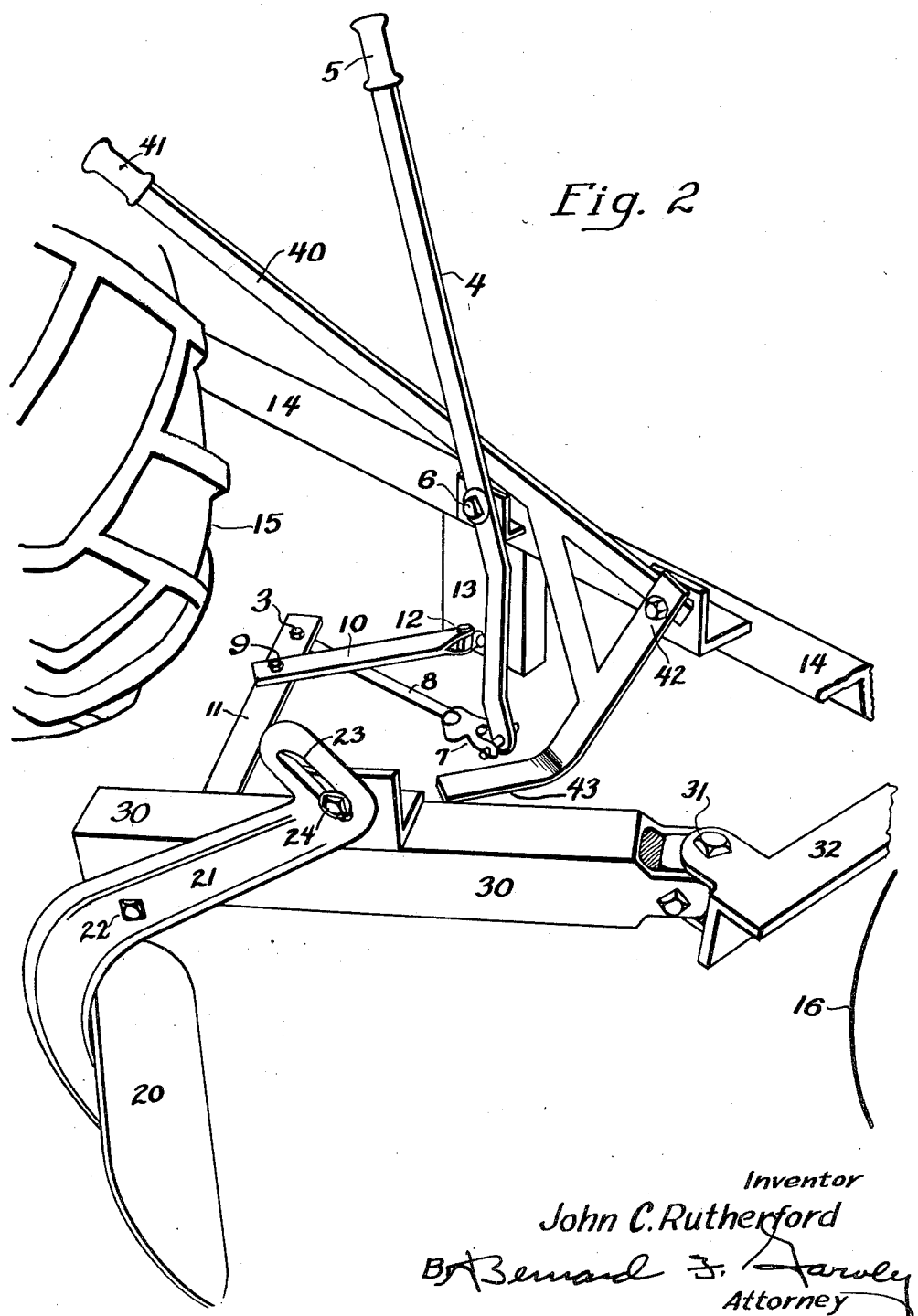
Figure 2 is a detail perspective view of the mechanism employed to manipulate the plow.

Referring in greater detail to the drawings showing a preferred embodiment of the invention, a tractor 1 is used which has a lever 4 pivotally mounted at 6 on chassis member 14. The upper end of lever 4 is provided with a hand grip 5 and the lower end is connected through a universal joint 7 to actuating rod 8. The other end of rod 8 is pivotally connected at 3 to a connecting linkage including two leg members 10 and 11 having a mutual pivot at 9. Leg 10 of the linkage is connected by means of universal joint 12 to mounting bracket 13 which is in turn secured to chassis member 14. Leg 11 of the linkage is connected to beam 30 by means of a pivot bolt (not shown).

A supporting member 32 is secured to the chassis 14 and extends laterally out from the side of the tractor. The extremity of supporting member 32 is connected through a universal joint 31 to the forward end of beam 30. Beam 30 is thus free to pivot in horizontal and vertical planes about the universal joint 31.

A plowshare or earth tool 20 is adjustably secured to beam 30 by means of plowshare holder 21 which is pivotally secured to beam 30 by a bolt 22. Another bolt 24 in an arcuate slot 23 of the plowshare holder is threaded in the beam 30 and may be tightened with the holder 21 at the desired angle. In this way the angle of "bite" of the plowshare 20 can be varied.

The universal joint 31 allows the weight of beam 30, plowshare 20 and plowshare holder 21 to keep plowshare 20 on the ground regardless of the level of the ground over which the wheels of the vehicle travel.

The angle at which plowshare 20 engages the earth may be set so that very little force is needed to maintain beam 30 in an extended position. The force of the earth tending to move plowshare 20 outward may thus be balanced with the force of the earth tending to move plowshare 20 inward. Therefore, the operator does not have to exert any appreciable force on handle 5 in order to maintain plowshare 20 in an extended position.

A lifting lever 40 pivotally mounted on the chassis 14 at 42 is provided for raising the plowshare 20 from the ground when the plow is not in use. Lift member 43 of lever 40 extends laterally from the side of the tractor below the level of the beam 30.

When the vehicle is being moved from one place to another and the plow is not in use, the plow may be lifted up off the ground by first withdrawing beam 30 to the side of the vehicle. Lift member 43 is then under beam 30. Then when handle 41 of lift lever 40 is raised, the lever pivots about bolt 42 and lift member 43 raises beam 30, plow support 21 and plowshare 20 up off the ground. Lever 40 may be maintained in the up position by placing the lever handle on a hook or rack (not shown).

It will be understood that the embodiment shown and described is exemplary of the invention and that the scope thereof will be ascertained with reference to the appended claim.

What is claimed is:

On a vehicle, a beam and a universal joint connecting the forward end of said beam to the vehicle, an earth tool fastened to the rearward end of said beam, a connecting linkage between the side of the vehicle and the rearward part of said beam, a lever pivoted on the vehicle and connected to said linkage, the lever being operative by acting on the linkage to vary the distance between the side of the vehicle and the rearward end of the beam, and a lifting lever pivoted on the vehicle, the lever being disposed to engage the underside of said beam when the beam is withdrawn to the side of the vehicle and being operative to raise the rearward portion of the beam about the universal joint.

JOHN C. RUTHERFORD.

REFERENCES CITED

The following references are of record in the file of this patent:

UNITED STATES PATENTS

| Number | Name | Date |
|---|---|---|
| 413,443 | Gregg | Oct. 22, 1889 |
| 461,290 | Taylor | Oct. 13, 1891 |
| 505,506 | Butt | Sept. 26, 1893 |
| 1,703,985 | Briscoe et al. | Mar. 5, 1929 |
| 2,253,130 | Lund | Aug. 19, 1941 |